(12) United States Patent
Yun et al.

(10) Patent No.: US 12,541,960 B2
(45) Date of Patent: Feb. 3, 2026

(54) METHOD AND SYSTEM FOR SENSOR FUSION IN VEHICLE

(71) Applicants: Hyundai Motor Company, Seoul (KR); Kia Corporation, Seoul (KR)

(72) Inventors: Bo Young Yun, Gyeonggi-do (KR); Nam Hyung Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 514 days.

(21) Appl. No.: 17/954,835

(22) Filed: Sep. 28, 2022

(65) Prior Publication Data
US 2023/0410489 A1   Dec. 21, 2023

(30) Foreign Application Priority Data
Jun. 17, 2022   (KR) .................. 10-2022-0074112

(51) Int. Cl.
| | | |
|---|---|---|
| *G06V 20/58* | (2022.01) | |
| *G06V 10/80* | (2022.01) | |
| *G01S 13/931* | (2020.01) | |
| *G01S 17/931* | (2020.01) | |

(52) U.S. Cl.
CPC ............ *G06V 10/803* (2022.01); *G06V 20/58* (2022.01); *G01S 13/931* (2013.01); *G01S 17/931* (2020.01)

(58) Field of Classification Search
CPC .... G06V 10/803; G06V 20/58; G06V 10/811; G01S 13/931; G01S 17/931; G01S 13/726; G01S 2013/93271; G01S 17/86; G01S 2013/9323; G01S 2013/93274; G01S 13/865; G01S 13/867; G01S 17/66; B60W 40/02; B60W 50/0097; B60W 60/001; B60W 2050/0005; B60W 2420/403
See application file for complete search history.

(56) References Cited

U.S. PATENT DOCUMENTS

| | | | |
|---|---|---|---|
| 10,997,435 B2 | 5/2021 | Abbott et al. | |
| 2019/0138825 A1* | 5/2019 | Lee ..................... | G06V 20/56 |

FOREIGN PATENT DOCUMENTS

| | | | |
|---|---|---|---|
| CN | 105427668 B | * | 10/2017 |
| KR | 10-2021-0152394 A | | 12/2021 |
| KR | 102371616 B1 | | 3/2022 |

OTHER PUBLICATIONS

Track-Level Fusion of Radar and Lidar Data (Year: 2021).*

* cited by examiner

*Primary Examiner* — Huo Long Chen
(74) *Attorney, Agent, or Firm* — Fox Rothschild LLP

(57) ABSTRACT

A method for sensor fusion in a vehicle comprises generating a track for a target vehicle based on data acquired through a surround view monitoring camera of the vehicle, acquiring a plurality of pieces of first point data for an object around the vehicle, identifying a plurality of pieces of second point data associated with the track from among the plurality of pieces of first point data, and updating a sensor fusion track generated for the target vehicle using the plurality of pieces of second point data.

14 Claims, 9 Drawing Sheets

☐ SENSOR FUSION TRACK
☐ TRACK GENERATED THROUGH FRONT-SIDE LIDAR
☐ TRACK GENERATED THROUGH CORNER RADAR
☐ TRACK GENERATED THROUGH CLOSE-RANGE VEHICLE DETECTION FUNCTION OF SURROUND VIEW MONITORING CAMERA
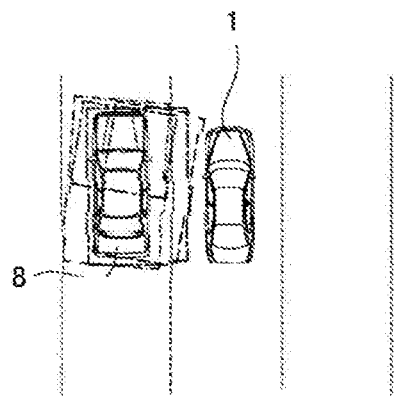
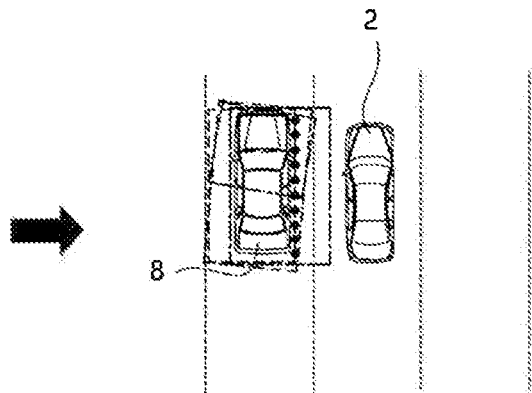
FIG. 8A
FIG. 8B

☐ SENSOR FUSION TRACK

☐ TRACK GENERATED THROUGH CORNER RADAR

☐ TRACK GENERATED THROUGH CLOSE-RANGE VEHICLE DETECTION FUNCTION OF SURROUND VIEW MONITORING CAMERA

METHOD AND SYSTEM FOR SENSOR FUSION IN VEHICLE

CROSS-REFERENCE TO RELATED APPLICATION(S)

This application claims, under 35 U.S.C. § 119(a), the benefit of Korean Patent Application No. 10-2022-0074112, filed on Jun. 17, 2022, which is incorporated herein by reference in its entirety.

BACKGROUND

Technical Field

Embodiments of the present disclosure relate to methods and systems for sensor fusion in a vehicle.

Description of the Related Art

Autonomous driving control of a vehicle may be performed through a recognition step, a determination step, and a control step, and sensor fusion logic may be performed in the recognition step of the autonomous driving control.

The sensor fusion logic is fusing data acquired from a plurality of sensing devices mounted in a vehicle to recognize a surrounding situation of the vehicle, for example, front-side LiDAR, front-side radar, rear-side radar, and/or a surround-view monitoring camera (for example, a wide-angle camera).

Conventionally, at a side of a vehicle, that is, at a front corner LiDAR (FCL) boundary region of the vehicle, instability of a track generated through FCL (also referred to as FCL track) is high, and thus there has been a problem of inaccuracies in heading of a target vehicle predicted by the vehicle based on the FCL track.

In addition, conventionally, when a target vehicle located on a side and/or rear side of a vehicle is in a low speed or stationary state, instability of a track generated through corner radar (CR) (also referred to as a CR track) is high, and thus there has been a problem in that accuracy of a location and heading of the target vehicle predicted by the vehicle based on the CR track is low.

In addition, conventionally, when a vehicle predicts a location, a speed, and/or heading of a target vehicle located on a side and/or rear side of the vehicle based on a track generated through a near vehicle detection (NVD) function of a surround view monitoring camera (also referred to as an NVD track), it has been difficult to apply the NVD track to prediction of the target vehicle due to low accuracy of the predicted location, speed, and/or heading of the target vehicle.

SUMMARY

Accordingly, the present disclosure is directed to a method and system for sensor fusion in a vehicle that substantially obviates one or more problems due to limitations and disadvantages of the existing technologies.

An object of the present disclosure is to provide a method and system for sensor fusion in a vehicle capable of improving accuracy of information about a surrounding object recognized through a sensing device of the vehicle.

For example, the method and system for sensor fusion in the vehicle may provide technology capable of solving a conventional problem in which, when a target vehicle is located on a side or rear side of the vehicle, the vehicle erroneously recognizes the target vehicle as invading a traveling lane of the vehicle.

In addition, the method and system for sensor fusion in the vehicle may provide new technology capable of efficiently utilizing a track, which is generated through an NVD function of a surround view monitoring camera, for predicting a target vehicle.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method for sensor fusion in a vehicle comprises generating a track for a target vehicle based on data acquired through a surround view monitoring camera of the vehicle, and acquiring a plurality of pieces of first point data for an object around the vehicle, identifying a plurality of pieces of second point data associated with the track from among the plurality of pieces of first point data, and updating a sensor fusion track generated for the target vehicle using the plurality of pieces of second point data.

The sensor fusion track may be pre-generated for the target vehicle based on sensor data acquired through a sensing device of the vehicle.

The target vehicle may be located on a side or rear side of the vehicle.

The identifying may comprise calculating a distance value from a center point of the track to any one corner of the track based on a width and a length of the track, and identifying the plurality of pieces of second point data associated with the track from among the plurality of pieces of first point data based on the distance value.

The identifying may comprise determining the distance value as a radius, and identifying the plurality of pieces of second point data located within the radius from the center point of the track from among the plurality of pieces of first point data.

The method may further comprise selecting point data at a first location and point data at a second location among the plurality of pieces of second point data based on an angle formed by a straight line connecting each of the plurality of pieces of second point data from an origin and an X-axis in a vehicle coordinate system having a designated location in the vehicle as the origin, in which the updating may comprise updating location information of the sensor fusion track based on information about the first location and the second location.

The point data at the first location may comprise point data having a smallest value as the angle among the plurality of pieces of second point data, and the point data at the second location may comprise point data having a largest value as the angle among the plurality of pieces of second point data.

The updating may comprise generating a two-dimensional equation representing a straight line connecting the first location and the second location, identifying a first coordinate value of a first corner among corners of the sensor fusion track, and determining a second coordinate value of a corner corresponding to the first corner among corners of the target vehicle based on the two-dimensional equation and the first coordinate value, and calculating a third coordinate value corresponding to a location of a midpoint of a rear bumper of the target vehicle, thereby updating location information of the sensor fusion track.

The first corner may comprise a corner located on a lower right side of a center of the sensor fusion track, a corner located on a lower left side of the center of the sensor fusion track, or a corner at a shortest distance from a straight line connecting the first location and the second location among the corners of the sensor fusion track.

The updating may comprise identifying the second coordinate value having the same Y-axis coordinate value as a Y-axis coordinate value of the first coordinate value in the straight line connecting the first location and the second location, calculating a heading angle of the sensor fusion track to be updated based on a slope of the straight line connecting the first location and the second location, and calculating the third coordinate value based on a half value of a width of the track and the calculated heading angle.

The heading angle may be calculated by applying a slope value of the two-dimensional equation as a variable of an arc tangent function, an X-axis value of the third coordinate value may be calculated based on a value calculated by applying the heading angle as a variable of a sine function, an X-axis value of the second coordinate value, and the half value of the width of the track, and a Y-axis value of the third coordinate value may be calculated based on a value calculated by applying the heading angle as a variable of a cosine function, a Y-axis value of the second coordinate value, and the half value of the width of the track.

In another aspect of the present disclosure, a system for sensor fusion in a vehicle comprises an interface configured to receive data from a sensing device of the vehicle, a memory configured to store data of a sensor fusion track generated for a target vehicle, and a processor electrically connected to the interface and the memory, in which the processor generates a track for the target vehicle based on data of a surround view monitoring camera of the vehicle received through the interface, and acquires a plurality of pieces of first point data for an object around the vehicle, identifies a plurality of pieces of second point data associated with the track from among the plurality of pieces of first point data, and updates the sensor fusion track using the plurality of pieces of second point data.

The target vehicle may be located on a side or rear side of the vehicle.

The processor may be configured to calculate a distance value from a center point of the track to any one corner of the track based on a width and a length of the track, and identify the plurality of pieces of second point data associated with the track from among the plurality of pieces of first point data based on the distance value.

The processor may be configured to determine the distance value as a radius, and identify the plurality of pieces of second point data located within the radius from the center point of the track from among the plurality of pieces of first point data.

The processor may be configured to select point data at a first location and point data at a second location among the plurality of pieces of second point data based on an angle formed by a straight line connecting each of the plurality of pieces of second point data from an origin and an X-axis in a vehicle coordinate system having a designated location in the vehicle as the origin, and update location information of the sensor fusion track based on information about the first location and the second location.

The point data at the first location may comprise point data having a smallest value as the angle among the plurality of pieces of second point data, and the point data at the second location may comprise point data having a largest value as the angle among the plurality of pieces of second point data.

The processor may be configured to generate a two-dimensional equation representing a straight line connecting the first location and the second location, identify a first coordinate value of a first corner among corners of the sensor fusion track, determine a second coordinate value of a corner corresponding to the first corner among corners of the target vehicle based on the two-dimensional equation and the first coordinate value, and calculate a third coordinate value corresponding to a location of a midpoint of a rear bumper of the target vehicle, thereby updating location information of the sensor fusion track.

The processor may be configured to identify the second coordinate value having the same Y-axis coordinate value as a Y-axis coordinate value of the first coordinate value in the straight line connecting the first location and the second location, calculate a heading angle of the sensor fusion track to be updated based on a slope of the straight line connecting the first location and the second location, and calculate the third coordinate value based on a half value of a width of the track and the calculated heading angle.

The heading angle may be calculated by applying a slope value of the two-dimensional equation as a variable of an arc tangent function, an X-axis value of the third coordinate value may be calculated based on a value calculated by applying the heading angle as a variable of a sine function, an X-axis value of the second coordinate value, and the half value of the width of the track, and a Y-axis value of the third coordinate value may be calculated based on a value calculated by applying the heading angle as a variable of a cosine function, a Y-axis value of the second coordinate value, and the half value of the width of the track.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 8A and 8B and FIGS. 9A and 9B are diagrams for comparing information of a target vehicle recognized when conventional sensor fusion logic is applied with information of the target vehicle recognized when sensor fusion logic according to an exemplary embodiment of the present disclosure is applied.

DETAILED DESCRIPTION

Figure 1A:
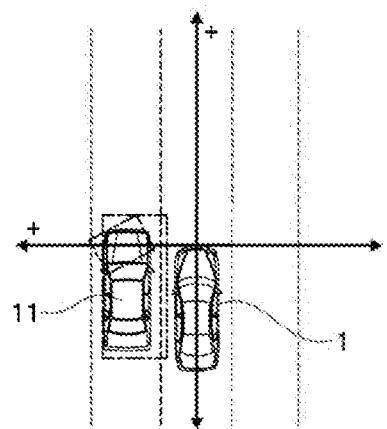
FIGS. 1A and 1B are diagrams illustrating an example in which a conventional vehicle erroneously recognizes information about a target vehicle.

Like reference numerals refer to like elements throughout the specification. This specification does not describe all elements of the embodiments, and general content in the technical field to which the present disclosure pertains or content overlapping among the embodiments is omitted. A "unit", "module", or "device" used in this specification may be implemented as software or hardware. According to the embodiments, a plurality of "units", "modules", or "devices" may be implemented as one element, or one "unit", "module", or "device" may comprise a plurality of elements.

Throughout the specification, when a part is referred to as being "connected" to another part, the part may be directly connected or indirectly connected to the other part. Further, indirect connection includes connection through a wireless communication network.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In addition, when a part is referred to as "including" an element, another element may be further included, rather than excluding another element, unless otherwise stated.

Terms such as "first", "second", etc. are used to distinguish one element from another element, and the elements are not limited by the above-mentioned terms.

A singular expression includes the plural form unless the context clearly dictates otherwise.

In each step, an identification code is used for convenience of description, and the identification code does not describe the order of each step. Each step may be performed differently from the specified order unless context clearly indicates a specific order.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Figure 1B:
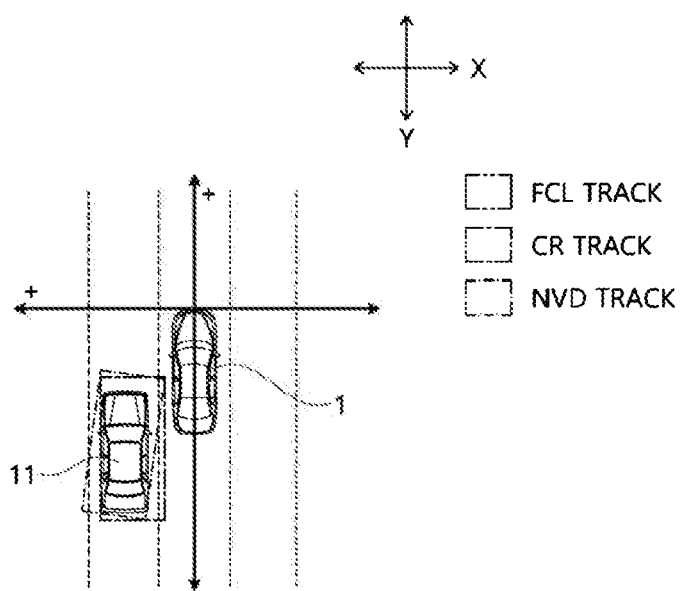

FIGS. 1A and 1B are diagrams illustrating an example in which a conventional vehicle erroneously recognizes information about a target vehicle.

Referring to FIG. 1A, when a target vehicle 11 is located on a side of a vehicle 1, the conventional vehicle 1 generates an FCL track and a CR track as illustrated in FIG. 1A based on data acquired through FCL (not illustrated) and CR (not illustrated).

Referring to FIG. 1A, the FCL track is formed to indicate that the heading of the target vehicle 11 is directed in a direction of a lane in which the vehicle 1 travels, unlike actual driving information of the target vehicle 11. In addition, a part of the CR track is formed to overlap with the lane in which the vehicle 1 travels, unlike actual driving information of the target vehicle 11.

Referring to FIG. 1B, when the target vehicle 11 is located on a rear side of the vehicle 1, the conventional vehicle 1 generates a CR track as in FIG. 1B through CR (not illustrated), and generates an NVD track as in FIG. 1B using an NVD function of a wide-angle camera (not illustrated).

Referring to FIG. 1B, a part of the CR track is formed to overlap with the lane in which the vehicle 1 travels, unlike actual driving information of the target vehicle 11. In addition, the NVD track is formed so that the heading of the target vehicle 11 is directed in a direction of the lane in which the vehicle 1 travels and a part thereof overlaps with the lane in which the vehicle 1 travels, unlike actual driving information of the target vehicle 11.

As in FIGS. 1A and 1B, conventionally, when a vehicle fusion system of a vehicle generates a sensor fusion track using physical information of a track generated through FCL, a track generated through CR (for example, front-side CR and/or rear-side CR), and/or a track generated through an NVD function of a wide-angle camera in a state where another vehicle, that is, a target vehicle, is located on a side or a rear side of the vehicle, there has been a problem in that the target vehicle is erroneously recognized as invading a traveling lane of the vehicle.

In order to solve the conventional erroneous recognition problem illustrated in FIGS. 1A and 1B, an exemplary embodiment of the present disclosure provides a sensor fusion method and system using point data by outputting space occupancy information for the target vehicle as point data through a surround view monitoring camera (also referred to as a wide-angle camera).

Hereinafter, the working principle and embodiments of the present disclosure will be described with reference to the accompanying drawings.

Figure 2:
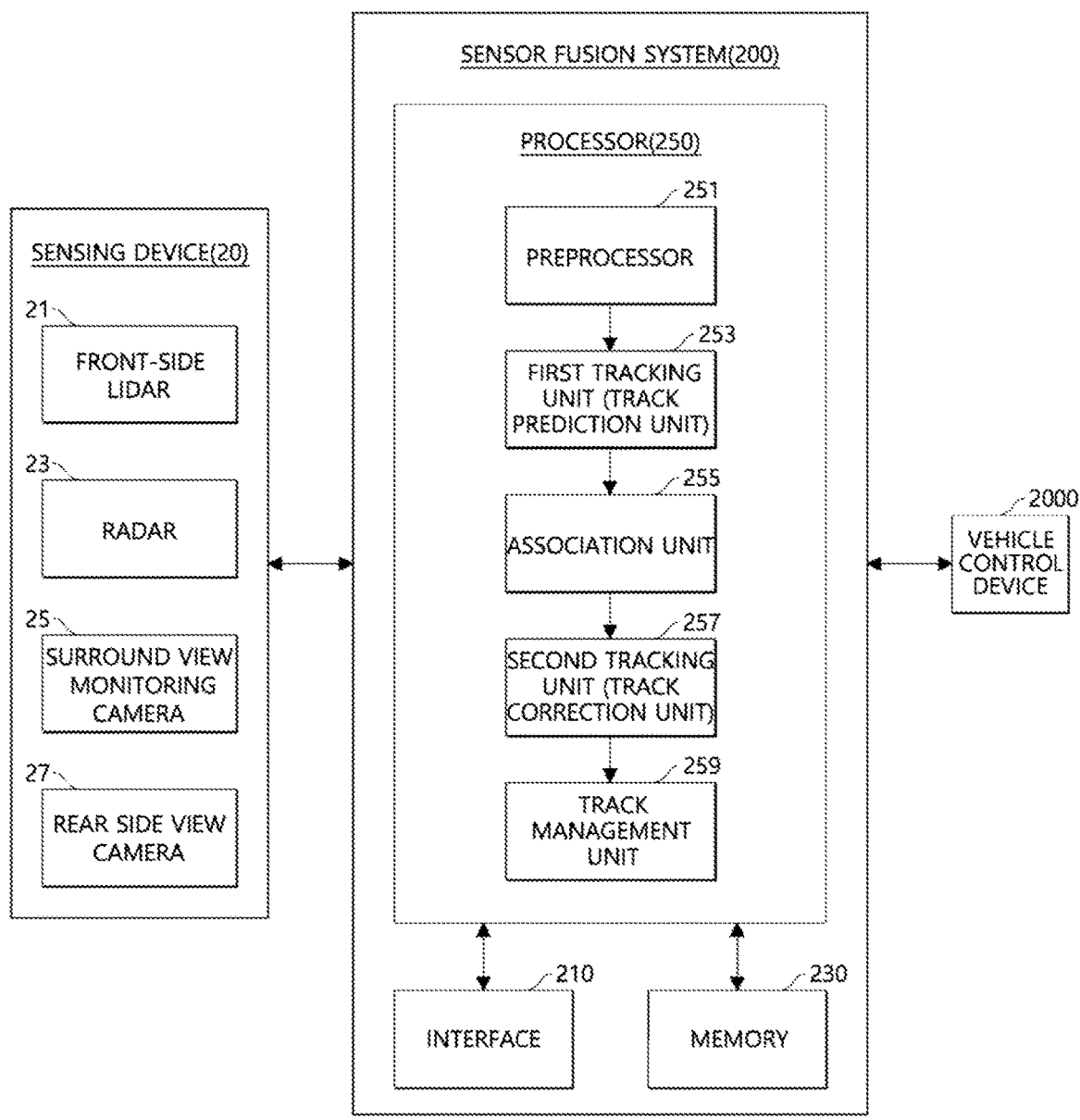
FIG. 2 is a block diagram of a vehicle and a sensor fusion system of the vehicle according to an exemplary embodiment.

FIG. 2 is a block diagram of a vehicle and a sensor fusion system of the vehicle according to an exemplary embodiment.

Figure 3:
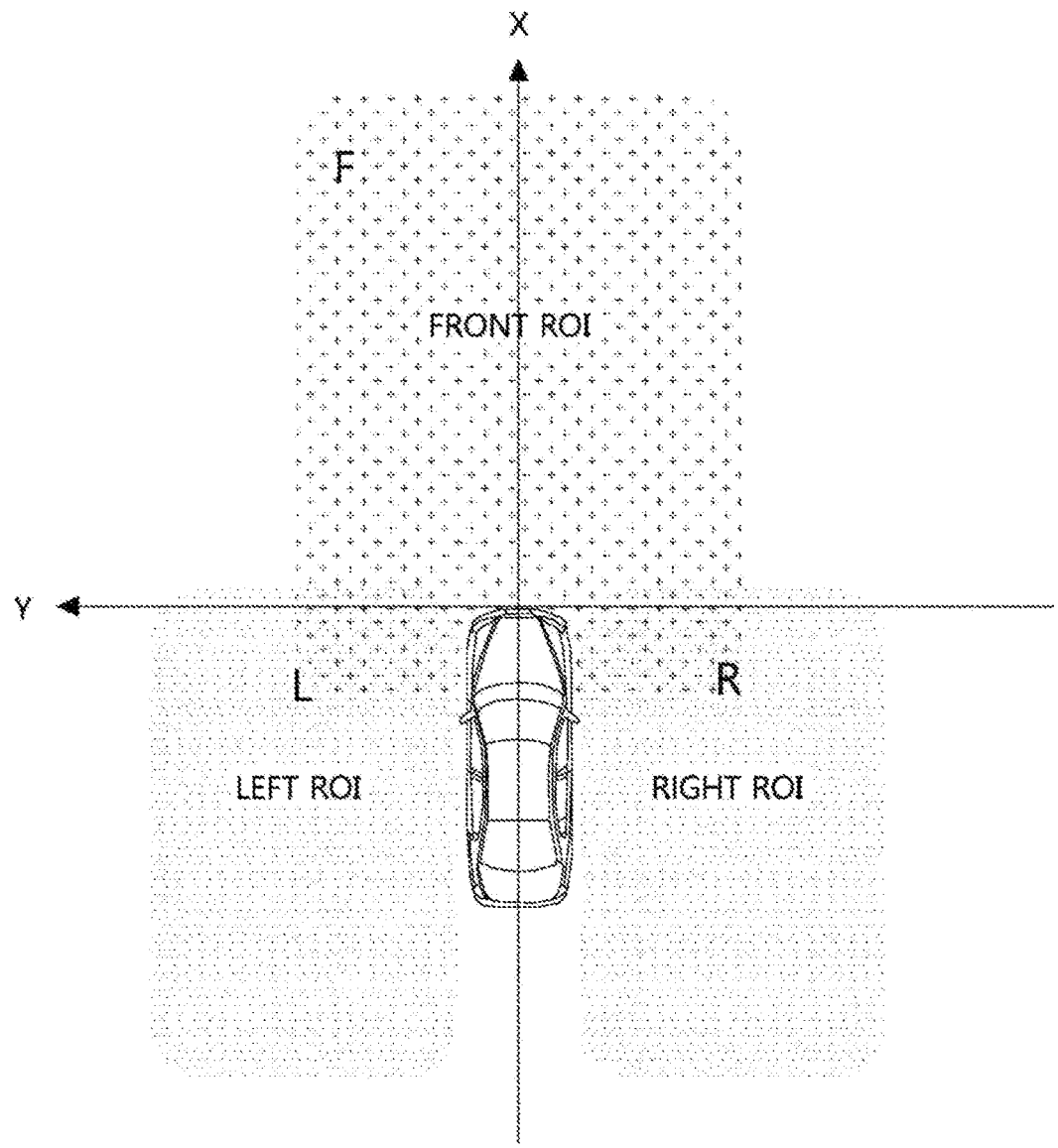
FIG. 3 is a diagram illustrating a range of a region of image data that can be acquired by a surround view monitoring camera according to an exemplary embodiment.

FIG. 3 is a diagram illustrating a range of a region of image data that can be acquired by the surround view monitoring camera according to an exemplary embodiment.

Figure 4:
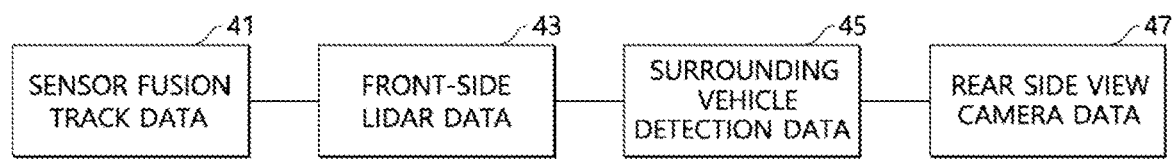
FIG. 4 is a diagram illustrating data used in the sensor fusion system according to an exemplary embodiment.

FIG. 4 is a diagram illustrating data used in the sensor fusion system according to an exemplary embodiment.

Referring to FIG. 2, a vehicle 2 may comprise a sensing device 20, a sensor fusion system 200, and a vehicle control device 2000.

The sensing device 20 may comprise one or more devices capable of acquiring information about an object located around the vehicle 2, for example, information about a target vehicle.

The sensing device 20 may comprise front-side LiDAR 21, radar 23, a surround view monitoring camera 25, and/or a rear side view camera 27.

The front-side LiDAR may be configured to scan the area in front of the vehicle 2 to detect an object.

The radar 23 may be configured to detect an object around the vehicle 2.

For example, the radar 23 may comprise front radar (not illustrated) installed in front of the vehicle 2, first CR (not illustrated) installed at a front right side of the vehicle 2, second CR (not illustrated) installed at a front left side, third CR (not illustrated) installed at a rear right side, and/or fourth CR (not illustrated) installed at a rear left side, and may have a detection field of view directed toward the front, front right, front left, rear right, and/or right left of the vehicle 1.

The surround view monitoring camera 25 may be configured to acquire image data of the surroundings of the vehicle 2 to monitor the surroundings of the vehicle 2.

For example, the surround view monitoring camera 25 may comprise a wide-angle camera, a front-facing camera, a right-facing camera, and/or a left-facing camera.

For example, a range of a region of image data that can be acquired by the surround view monitoring camera 25 may comprise regions of interest illustrated in FIG. 3.

Referring to FIG. 3, the range of the region of the image data that can be acquired by the surround view monitoring camera 25 may comprise a left region of interest (L: Left ROI), a right region of interest (R: Right ROI), and/or a front region of interest (F: Front ROI) in a vehicle coordinate system (X-Y coordinate system) having a designated location in the vehicle 2 as the origin.

The rear side view camera 27 may be configured to acquire image data of an area behind the vehicle 2 to monitor the area behind the vehicle 2.

The sensor fusion system 200 may be configured to generate a sensor fusion track for each of one or more objects, for example, one or more target vehicles, based on data received from the sensing device 20, and update the generated sensor fusion track.

The sensor fusion system 200 may comprise an interface 210, a memory 230, and a processor 250.

The interface 210 may be configured to deliver a command or data input from another device of the vehicle 2 or a user to another element of the sensor fusion system 200, or output a command or data received from another element of the sensor fusion system 200 to another device of the vehicle 2.

The interface 210 may comprise a communication module (not illustrated) to communicate with the sensing device 20 and/or the control device 2000.

For example, the communication module may comprise a wired communication module (for example, a powerline communication module) and/or a wireless communication module (for example, a cellular communication module, a Wi-Fi communication module, a short-range wireless communication module, and/or a global navigation satellite system (GNSS) communication module). In addition, the communication module comprises a communication module enabling communication between devices of the vehicle 2, for example, controller area network (CAN) communication and/or local interconnect network (LIN) communication, via a vehicle communication network.

The memory 230 may be configured to store various data used by at least one element of the sensor fusion system 200, for example, input data and/or output data for a software program and a command related thereto.

The memory 230 may be configured to store data received from the sensing device 20, data acquired by the processor 250, data output by the processor 250 (for example, sensor fusion track data, etc.). In addition, the memory 230 may be configured to store an algorithm for executing sensor fusion.

For example, the memory 230 may comprise a non-volatile memory such as a cache, a read only memory (ROM), a programmable ROM (PROM), an erasable programmable ROM (EPROM), an electrically erasable programmable ROM (EEPROM), and/or a flash memory, and/or a volatile memory such as random access memory (RAM).

The processor 250 may be configured to perform a sensor fusion operation based on data received from the sensing device 20 through the interface 210, and allow result data according to performance of the sensor fusion operation to be provided to the control device 2000 through the interface 210.

The processor 250 may be configured to generate a sensor fusion track for the target vehicle based on data of the sensing device 20 received through the interface 210, and store the sensor fusion track in the memory 230.

The processor 250 may be configured to primarily generate a sensor fusion track for the target vehicle through a conventional sensor fusion track generation technology.

In addition, in order to improve accuracy of the sensor fusion track generated for the target vehicle, in particular the sensor fusion track for the target vehicle located on the side or rear side of the vehicle 2, the processor 250 may be configured to perform an additional operation to update the primarily generated sensor fusion track for the target vehicle.

For example, the processor 250 may be configured to extract point data associated with the target vehicle located around the vehicle 2 in order to improve accuracy of the sensor fusion track for the target vehicle. The processor 250 may be configured to update the sensor fusion track generated for the target vehicle by shift-correcting the sensor fusion track generated for the target vehicle using the extracted point data.

For example, in order to generate and update the sensor fusion track, the processor 250 may be configured to utilize data illustrated in FIG. 4, that is, sensor fusion track data 41, front-side LiDAR data 43 received from the front-side LiDAR 21, surrounding vehicle detection data 45 acquired using the surround view monitoring camera, and/or rear side view camera data 47 received from the rear side view camera 27.

Referring back to FIG. 2, the processor 250 may comprise a preprocessor 251, a first tracking unit 253, an association unit 255, a second tracking unit 257, and/or a track management unit 259.

The preprocessor 251 may be configured to receive data from the sensing device 20 and perform time and/or spatial synchronization of the data received from the sensing device 20.

The preprocessor 251 may be configured to filter a sensor track suitable for use in sensor fusion through validity check.

The preprocessor 251 may be configured to extract point data associated with the target vehicle located around the vehicle 2 in a validity check step.

The first tracking unit 253 (also referred to as a track prediction unit) may be configured to predict a sensor track of each object located around the vehicle 2. The sensor track may have a box shape fit to the periphery of the object, and the object may comprise the target vehicle located around the vehicle.

The association unit 255 may be configured to determine a correlation between data of a sensor fusion track of a previous frame (also referred to as data of the sensor track) and data of a sensor track of a current frame.

The association unit 255 may be configured to perform data conversion for determining a physical value of a specific sensor on a physical value of the sensor fusion track. Here, the physical value may be obtained by applying 100% of information of the specific sensor or may be obtained by additionally applying heterogeneous sensor information using a weight.

The second tracking unit 257 (also referred to as a track correction unit) may be configured to generate and/or correct a sensor fusion track of an object based on an association determination result of the association unit 255.

The track management unit 259 may be configured to manage update of the sensor fusion track. The track management unit 259 may comprise a track shift function, and may serve to shift-correct the physical value of the sensor fusion track of the target vehicle, that is, update the sensor fusion track.

Referring back to FIG. 2, the control device 2000 (also referred to as a control circuit or processor) may be configured to control at least one other device of the vehicle 2, and may be configured to perform various data processing and calculations.

The control device 2000 may be configured to control autonomous driving of the vehicle 2. For example, the control device 2000 may be configured to control driving of the vehicle 2 based on data output from the sensor fusion system 200, for example, a sensor fusion track generated for the target vehicle.

The control device 2000 may comprise an electronic control unit (ECU) that controls a power system of the vehicle 2. The control device 2000 may comprise a processor and a memory.

Figure 5:
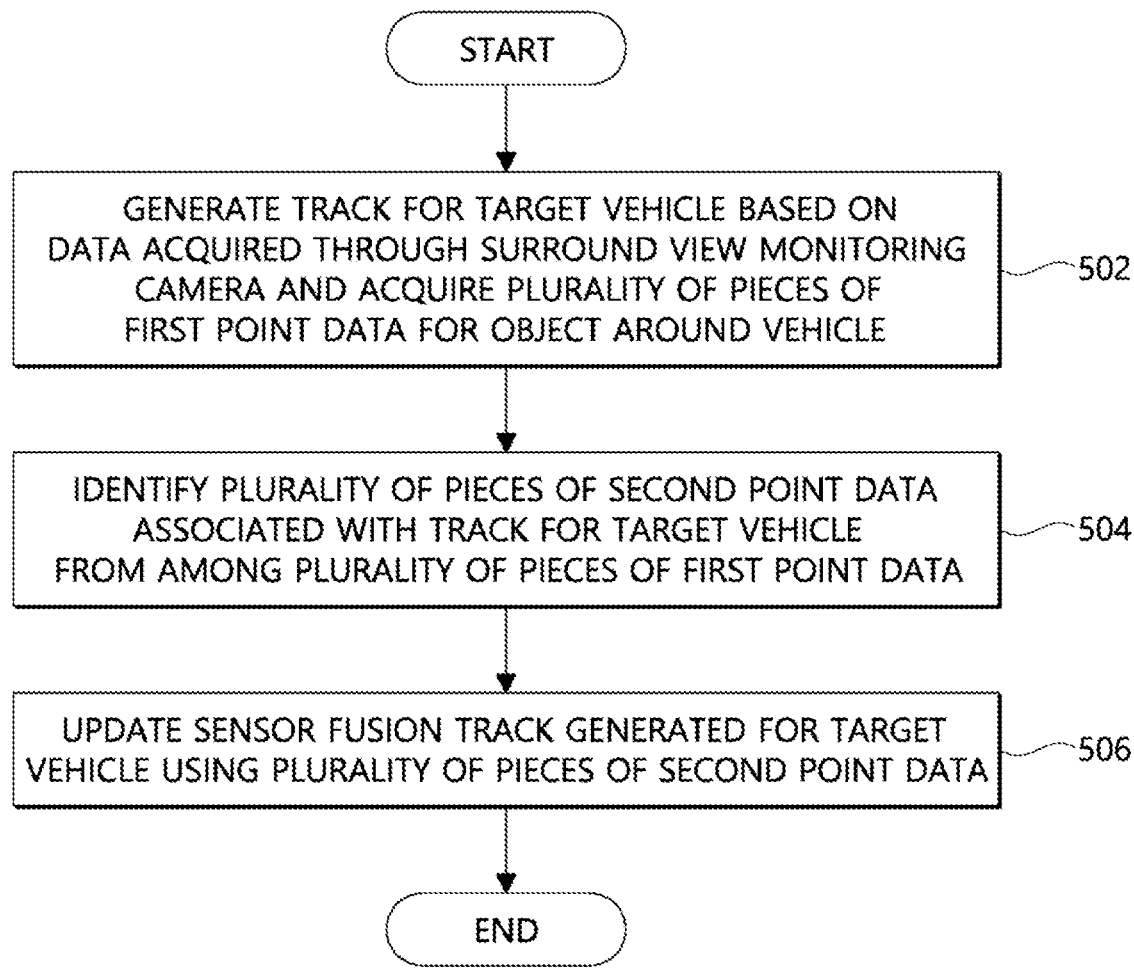
FIG. 5 is a flowchart for describing an operation of the sensor fusion system according to an exemplary embodiment.

FIG. 5 is a flowchart illustrating an operation of the sensor fusion system 200 (and/or the processor 250) according to an exemplary embodiment.

Referring to FIG. 5, the sensor fusion system 200 of the vehicle 2 may be configured to generate a track for the target vehicle based on data acquired through the surround view monitoring camera 25 and acquire a plurality of pieces of first point data for an object around the vehicle 1 (502).

For example, the target vehicle may be located on the side or rear side of the vehicle 2.

For example, the track generated based on the data obtained through the surround view monitoring camera 25 may be information recognized after tracking a corresponding object, that is, the target vehicle.

For example, the plurality of pieces of first point data indicates that the corresponding object occupies space of a corresponding location, and may be point data output as points at a pre-designated interval with respect to an outline of the corresponding object.

The sensor fusion system 200 may be configured to identify a plurality of pieces of second point data associated with the track for the target vehicle from among the plurality of pieces of first point data (504).

For example, the plurality of pieces of second point data may comprise point data located within a pre-designated range with respect to the track for the target vehicle among the plurality of pieces of first point data. Accordingly, when the target vehicle is not recognized, the plurality of pieces of second point data cannot be output.

A detailed embodiment of identifying the plurality of pieces of second point data will be described later with reference to FIGS. 6 and 7A.

The sensor fusion system 200 may be configured to update the sensor fusion track generated for the target vehicle using the plurality of pieces of second point data (506).

For example, the sensor fusion track generated for the target vehicle may be generated in advance based on sensor data obtained through a sensor of the sensing device 20 of the vehicle 2 using conventional sensor fusion logic.

To improve accuracy of the pre-generated sensor fusion track, the sensor fusion system 200 may be configured to update location information of the sensor fusion track using a method of selecting two pieces of point data included in the plurality of pieces of second point data and shifting the pre-generated sensor fusion track based on a line connecting the selected two pieces of point data.

A detailed embodiment of updating the location information of the sensor fusion track using a method of shifting the sensor fusion track will be described later with reference to FIGS. 6, 7B, and 7C.

Figure 6:
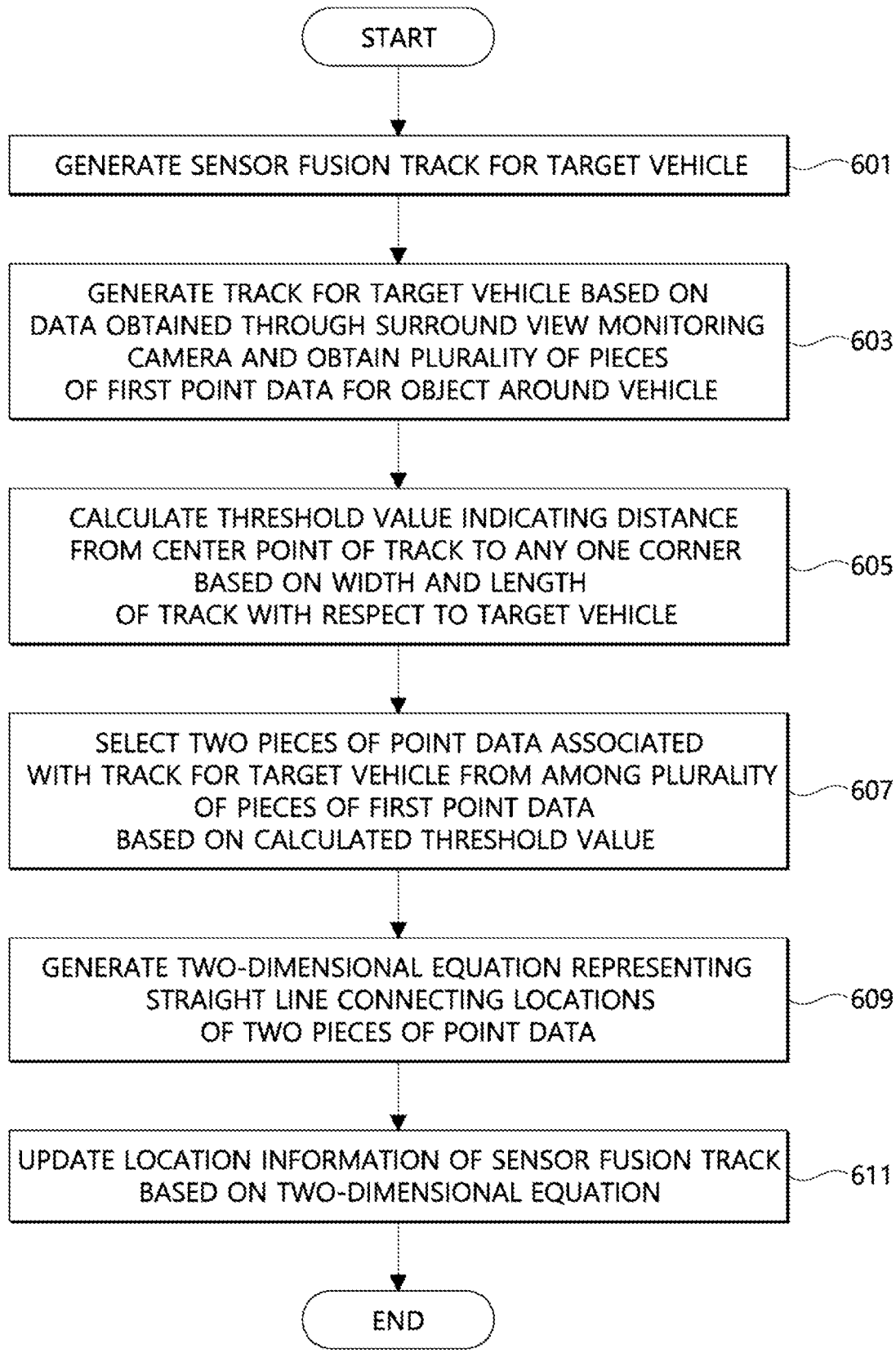
FIG. 6 is a flowchart for describing an operation of the sensor fusion system according to an exemplary embodiment.

FIG. 6 is a flowchart for describing an operation of the sensor fusion system 200 (and/or the processor 250) according to an exemplary embodiment.

Figure 7A:
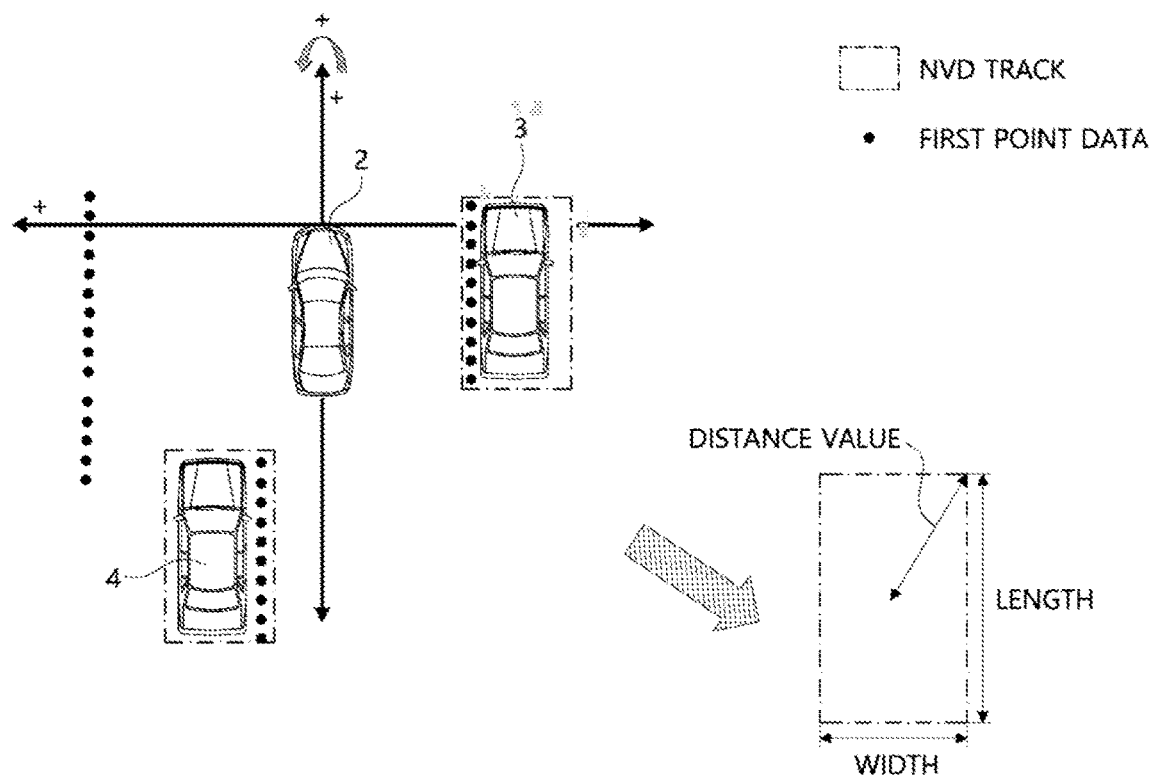
FIGS. 7A to 7C are diagrams for describing an operation of the sensor fusion system according to an exemplary embodiment.
Figure 7B:
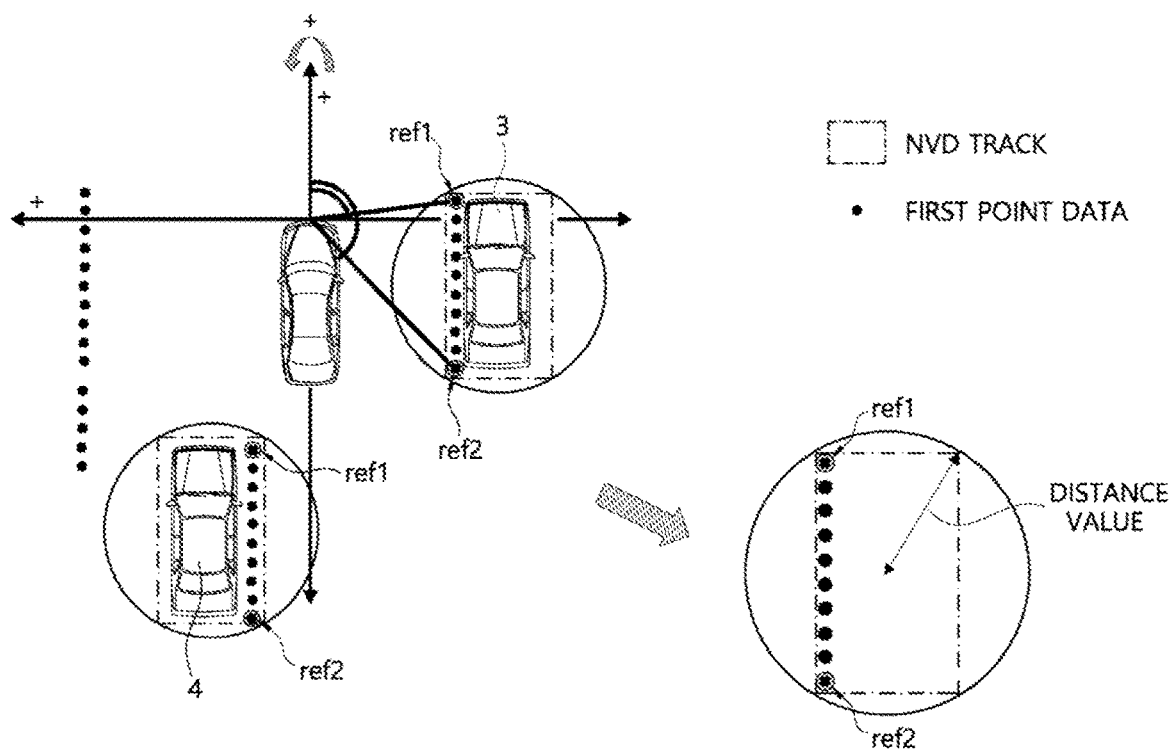
Figure 7C:
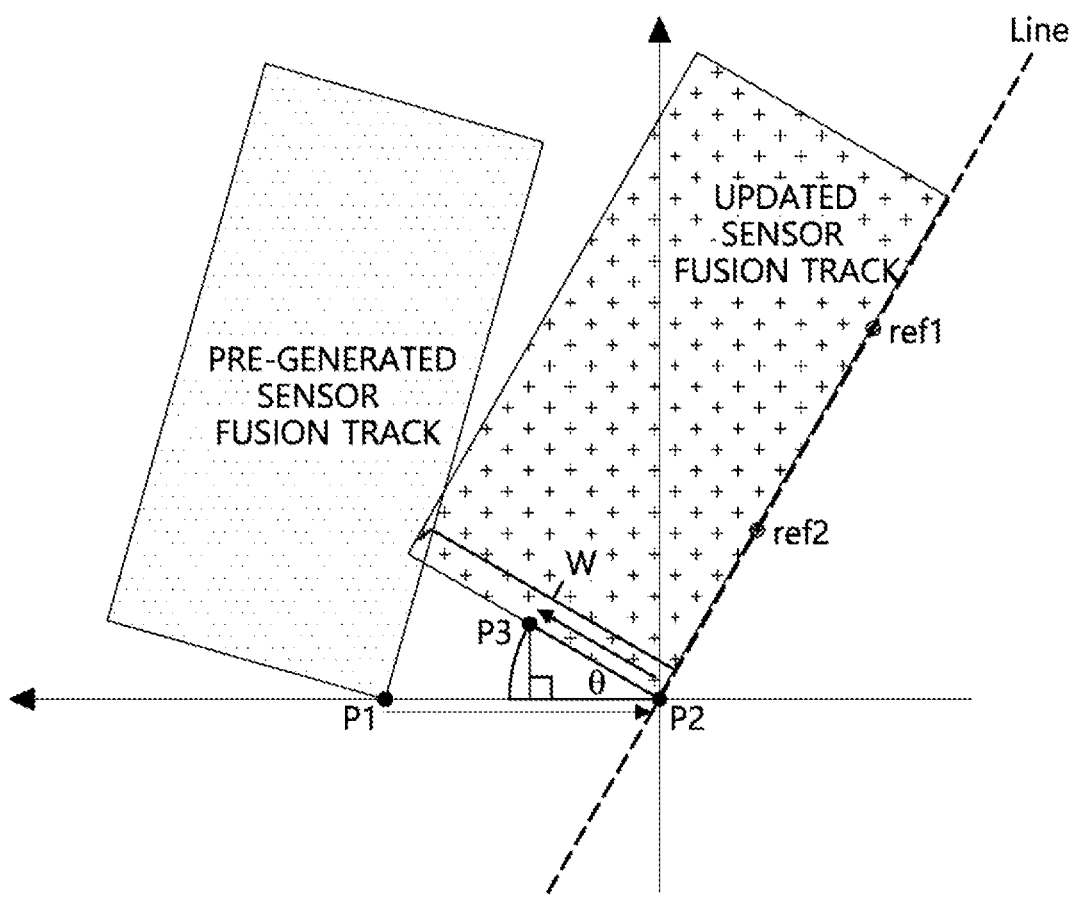

FIGS. 7A to 7C are diagrams for describing an operation of the sensor fusion system 200 (and/or the processor 250) according to an exemplary embodiment.

Referring to FIG. 6, the sensor fusion system 200 may be configured to generate a sensor fusion track for the target vehicle based on sensor data acquired through the sensing device 20 of the vehicle 2 (601).

For example, the sensor fusion system 200 may be configured to detect the target vehicle located around the vehicle 2 based on sensor data of the sensing device 20 and predict a plurality of sensor tracks of the detected target vehicle. In addition, the sensor fusion system 200 may be configured to identify whether the sensor tracks are the same object by varying weights using an overlapping range and distances between the plurality of predicted sensor tracks, and fuse the sensor tracks identified as the same object to generate a sensor fusion track.

Referring to FIG. 7A, target vehicles 3 and 4 may be located on the side or rear side of the vehicle 2.

The sensor fusion system 200 may be configured to generate a track for a target vehicle based on data obtained through the surround view monitoring camera 25 and obtain a plurality of pieces of first point data for an object around the vehicle (603).

Referring to FIG. 7A, the sensor fusion system 200 may be configured to generate a track (NVD track) for each of a first target vehicle 3 and a second target vehicle 4 based on data (also referred to as image data) acquired through the surround view monitoring camera 25. In addition, the sensor fusion system 200 may be configured to acquire a plurality of pieces of first point data for an object around the vehicle 2 based on data acquired through the surround view monitoring camera 25.

For example, the plurality of pieces of first point data indicates that the corresponding object occupies space of a corresponding location, and may be point data output as points at a pre-designated interval with respect to an outline of the corresponding object.

The sensor fusion system 200 may be configured to calculate a threshold value indicating a distance from a center point of a track to any one corner based on a width and length of the track with respect to the target vehicle (605).

Referring to FIG. 7A, the sensor fusion system 200 may be configured to identify a width and length of the track (NVD track) of each of the target vehicles 3 and 4, and calculate a threshold value indicating a distance from a center point of each track (NVD track) to any one corner, that is, a distance value (also referred to as a gate distance) through the following Equation 1.

$$\text{Value} = \left(\frac{\sqrt{\text{Width}^2 + \text{Length}^2}}{2}\right) - N \quad \text{[Equation 1]}$$

(Value: distance value, Width: width of track (NVD track), Length: length of track (NVD track), N: pre-designated value (for example, 0.3, etc., the value can be variously changed according to user setting))

For example, the width and length of each of the target vehicles 3 and 4 may be pre-designated (for example, width 2 m, length: 5 m).

Meanwhile, the threshold value indicating the distance from the center point of each track (NVD track) to any one corner, that is, the distance value, may be changed according to user setting.

The sensor fusion system 200 may be configured to select two pieces of point data associated with the track for the target vehicle from among the plurality of pieces of first point data based on the calculated threshold value (607).

Referring to FIG. 7B, the sensor fusion system 200 may be configured to determine, as a radius, the threshold value indicating the distance from the center point of the track (NVD track) to any one corner, that is, the distance value based on the width and length of the track (NVD track) for each of the target vehicles 3 and 4.

In addition, referring to FIG. 7B, the sensor fusion system 200 may be configured to identify a plurality of pieces of second point data located within a radius from the center point of the track (NVD track) for each of the target vehicles 3 and 4 from among the plurality of pieces of first point data.

In addition, referring to FIG. 7B, the sensor fusion system 200 may be configured to select point data ref1 at a first location and point data ref2 at a second location from among the plurality of pieces of second point data based on an angle (absolute value of angle) formed by a straight line connecting each of the plurality of pieces of second point data from the origin and an X-axis in a vehicle coordinate system having a designated location in the vehicle 2 as the origin.

For example, the sensor fusion system 200 may be configured to select the point data ref1 having the smallest angle value among the plurality of pieces of second point data, and select the point data ref2 having the largest angle value among the plurality of pieces of second point data.

The sensor fusion system 200 may be configured to generate a two-dimensional equation representing a straight line connecting locations of two pieces of point data (609).

The sensor fusion system 200 may be configured to generate the following two-dimensional equation based on coordinate values of the point data ref1 at the first location and coordinate values of the point data ref2 at the second location.

$$A_{shift} \times x B_{shift} \times y + C_{shift} = 0$$

$$A_{shift} = y_{ref1} - y_{ref2}$$

$$B_{shift} = x_{ref2} - x_{ref1}$$

$$C_{shift} = x_{ref1} \times y_{ref2} - y_{ref1} \times x_{ref2}$$

($y_{ref1}$: Y-axis coordinate value of the point data ref1 at the first location, $y_{ref2}$: Y-axis coordinate value of the point data ref2 at the second location, $x_{ref1}$: X-axis coordinate value of the point data ref1 at the first location, $x_{ref2}$: X-axis coordinate value of the point data ref2 at the second location)

The sensor fusion system 200 may be configured to update location information of the sensor fusion track based on the two-dimensional equation (611).

Referring to FIG. 7C, the sensor fusion system 200 may be configured to identify a first coordinate value P1 of a first corner among corners of the sensor track generated in advance according to operation 601.

For example, the sensor fusion system 200 may be configured to determine, as the first corner, a corner located on a lower right side of a center of the sensor fusion track, a corner located on a lower left side of the center of the sensor fusion track, or a corner at a shortest distance from a straight line Line connecting the point data ref1 at the first location and the point data ref2 at the second location among the corners of the sensor fusion track generated in advance.

The sensor fusion system 200 may be configured to determine a second coordinate value of a corner corresponding to the first corner among the corners of each of the target vehicle 3 and 4 based on the two-dimensional equation and the first coordinate value P1, and calculate a third coordinate value P3 corresponding to a location of a midpoint of a rear bumper of each of the target vehicles 3 and 4, thereby updating the location information of the existing sensor fusion track.

For example, the sensor fusion system 200 may be configured to identify the second coordinate value P2 having the same Y-axis coordinate value as a Y-axis coordinate value of the first coordinate value P1 on the straight line Line connecting the point data ref1 at the first location and the point data ref2 at the second location.

For example, the sensor fusion system 200 may be configured to calculate the second coordinate value P2 through the following Equation 2.

$$x_{P2} = x_{P1}$$
$$y_{P2} = -\frac{A_{shift}}{B_{shift}} \times x_{P1} - \frac{C_{shift}}{B_{shift}}$$

[Equation 2]

($x_{p2}$: x-axis coordinate value of P2, $x_{p1}$: x-axis coordinate value of P1, $y_{p2}$: y-axis coordinate value of P2, $A_{shift} = y_{ref2} - y_{ref2}$, $B_{shift} = x_{ref2} - x_{ref1}$, $C_{shift} = x_{ref1} \times y_{ref2} - y_{ref1} \times x_{ref2}$)

In addition, the sensor fusion system 200 may be configured to calculate a heading angle of the sensor fusion track to be updated based on a slope of the straight line Line, and calculate the third coordinate value P3 based on a half value of the width of the track (NVD track) and the calculated heading angle.

For example, the sensor fusion system 200 may be configured to calculate the heading angle by applying a slope value of the two-dimensional equation as a variable of an arc tangent function. In addition, the sensor fusion system 200 may be configured to calculate an X-axis value of the third coordinate value based on a value calculated by applying the heading angle as a variable of a sine function, an X-axis value of the second coordinate value, and the half value of the width of the track (NVD track). In addition, the sensor fusion system 200 calculates a Y-axis value of the third coordinate value based on a value calculated by applying the heading angle as a variable of a cosine function, a Y-axis value of the second coordinate value, and the half value of the width of the track (NVD track).

For example, the sensor fusion system 200 may be configured to calculate the third coordinate value based on the following Equation 3.

$$x_{p3} = x_{p2} - 0.5 * W * \sin(LineHeading)$$
$$y_{p3} = y_{p2} + 0.5 * W * \cos(LineHeading)$$

[Equation 3]

($x_{p3}$: x-axis coordinate value of P3, $y_{p3}$: y-axis coordinate value of P3, W: width of the track (NVD track), $$LineHeading = \arctan\left(-\frac{A_{shift}}{B_{shift}}\right),$$

$A_{shift} = y_{ref1} - y_{ref2}$, $B_{shift} = x_{ref2} - x_{ref1}$)

The sensor fusion system 200 may be configured to shift, that is, update the location of the sensor fusion track through the above-described operations. For example, the sensor fusion system 200 may be configured to set, as the second coordinate value, a coordinate value of a corner of each of the target vehicles 3 and 4 corresponding to the first corner of the pre-generated sensor fusion track, and apply the third coordinate value P3 corresponding to the location of the midpoint of the rear bumper of each of the target vehicles 3 and 4, thereby updating the location information of the pre-generated sensor fusion track.

Meanwhile, in addition to the above-described embodiment of FIG. 6, the sensor fusion system 200 may be configured to determine whether the target vehicle is located on the side or rear side of the vehicle 2 before the above-described operation 603, and perform operation 603 upon determining that the target vehicle is located on the side or rear side of the vehicle 2.

FIGS. 8A and 8B and FIGS. 9 and 9B are diagrams for comparing information of a target vehicle recognized when conventional sensor fusion logic is applied with information of the target vehicle recognized when sensor fusion logic according to an exemplary embodiment of the present disclosure is applied.

Referring to FIGS. 8A and 8B, when a target vehicle 8 is located on a side of each of the vehicles 1 and 2 (for example, located in a lane on a left side of a lane in which each of the vehicles 1 and 2 travels), a conventional sensor fusion system may be configured to output a result illustrated in FIG. 8A, and the sensor fusion system 200 according to the embodiment of the present disclosure may be configured to output a result illustrated in FIG. 8B.

Referring to FIG. 8A, it can be seen that the conventional sensor fusion system generates a sensor fusion track such that the target vehicle 8 invades the lane of the vehicle 1 due to inaccurate lateral location information and heading angle information of the target vehicle 8. For example, all of a track generated through conventional front-side LiDAR, a track generated through CR, a track generated through a close-range vehicle detection function of the surround view monitoring camera, and a sensor fusion track may be generated such that the target vehicle 8 invades the lane of the vehicle 2.

Referring to FIG. 8B, it can be seen that the sensor fusion system 200 according to the embodiment of the present disclosure generates a sensor fusion track such that the target vehicle 8 does not invade the lane of the vehicle 2 due to update of the sensor fusion track, that is, shift correction of the sensor fusion track. For example, even though the target vehicle 8 invades the lane in a track generated through the front-side LiDAR 21, a track generated through the CR 23, and a track generated through a close-range vehicle detection function of the surround view monitoring camera 25, the sensor fusion track updated according to the embodiment of the present disclosure may be generated such that the target vehicle 8 does not invade the lane of the vehicle 2.

Figure 9A:
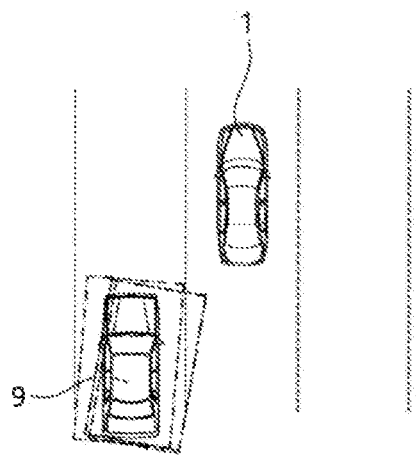
Figure 9B:
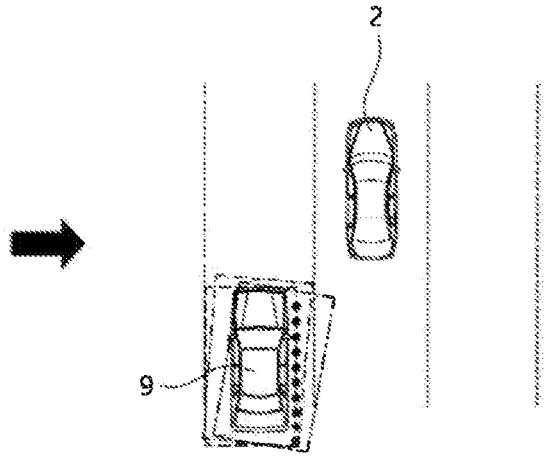

Referring to FIGS. 9A and 9B, when a target vehicle 9 is located on a rear side of each of the vehicles 1 and 2 (for example, located behind each of the vehicles 1 and 2 and in a lane on a left side of a lane in which each of the vehicles 1 and 2 travels), a conventional sensor fusion system may be configured to output a result illustrated in FIG. 9A, and the sensor fusion system 200 according to the embodiment of the present disclosure may be configured to output a result illustrated in FIG. 9B.

Referring to FIG. 9A, it can be seen that the conventional sensor fusion system generates a sensor track such that the target vehicle 9 invades the lane of the vehicle 1 due to inaccurate lateral location information and heading angle information of the target vehicle 9. For example, all of a track generated through conventional CR and a track generated through a close-range vehicle detection function of the surround view monitoring camera may be generated such that the target vehicle 9 invades the lane of the vehicle 2.

Referring to FIG. 9B, it can be seen that the sensor fusion system 200 according to the embodiment of the present disclosure generates a sensor fusion track such that the target vehicle 9 does not invade the lane of the vehicle 2 due to update of the sensor fusion track, that is, shift correction of the sensor fusion track. For example, even though the target vehicle 9 invades the lane in a track generated through the CR 23 and a track generated through a close-range vehicle detection function of the surround view monitoring camera 25, the sensor fusion track generated according to the embodiment of the present disclosure may be generated such that the target vehicle 9 does not invade the lane of the vehicle 2.

According to the above-described embodiments, the sensor fusion system 200 of the present disclosure can improve accuracy of the sensor fusion track by updating the sensor fusion track not accurately matched with an actual driving situation of the target vehicle by the conventional sensor fusion system when the target vehicle is located on the side or rear side of the vehicle 2. Accordingly, it is possible to solve a problem that the vehicle 2 erroneously recognizes the target vehicle as invading the traveling lane of the vehicle 2 when the target vehicle is located on the side or rear side of the vehicle 2, and it is possible to improve accuracy of driving control of the vehicle 2.

The method and system for sensor fusion in the vehicle according to the present disclosure may provide technology capable of solving a conventional problem in which, when the target vehicle is located on the side or rear side of the vehicle, the vehicle erroneously recognizes the target vehicle as invading the traveling lane of the vehicle.

The method and system for sensor fusion in the vehicle according to the present disclosure may provide new technology capable of efficiently utilizing a track, which is generated through the NVD function of the surround view monitoring camera, for predicting the target vehicle.

The above-described embodiments may be implemented in the form of a recording medium storing instructions executable by a computer. Instructions may be stored in the form of program code, and when the instructions are executed by a processor, a program module may be created to perform the operations of the disclosed embodiments. The recording medium may be implemented as a computer-readable recording medium.

Examples of the computer-readable medium include any type of recording medium in which instructions readable by the computer are stored. Examples thereof may include a read only memory (ROM), a random access memory (RAM), a magnetic tape, a magnetic disk, a flash memory, an optical data storage device, etc.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method for sensor fusion in a vehicle, the method comprising:
   generating a track for a target vehicle based on data acquired through a surround view monitoring camera of a vehicle;
   acquiring a plurality of pieces of first point data for an object around the vehicle;
   identifying a plurality of pieces of second point data associated with the track for the target vehicle from among the plurality of pieces of first point data;
   updating a sensor fusion track generated for the target vehicle using the plurality of pieces of second point data; and
   control autonomous driving of the target vehicle based on the updated sensor fusion track;
   selecting point data at a first location and point data at a second location among the plurality of pieces of second point data based on an angle formed by a straight line connecting each of the plurality of pieces of second point data from an origin and an X-axis in a vehicle coordinate system having a designated location in the vehicle as the origin,
   wherein the updating comprises:
      updating location information of the sensor fusion track based on information about the first location and the second location;
      generating a two-dimensional equation representing a straight line connecting the first location and the second location;
      identifying a first coordinate value of a first corner among corners of the sensor fusion track;
      determining a second coordinate value of a corner corresponding to the first corner among corners of the target vehicle based on the two-dimensional equation and the first coordinate value;
      calculating a third coordinate value corresponding to a location of a midpoint of a rear bumper of the target vehicle, thereby updating location information of the sensor fusin track;
      identifying the second coordinate value having the same Y-axis coordinate value as a Y-axis coordinate value of the first coordinate value in the straight line connecting the first location and the second location;
      calculating a heading angle of the sensor fusion track to be updated based on a slope of the straight line connecting the first location and the second location; and
      calculating the third coordinate value based on a half value of a width of the track for the target vehicle and the calculated heading angle.

2. The method according to claim 1, wherein the sensor fusion track is pre-generated for the target vehicle based on sensor data acquired through a sensing device of the vehicle.

3. The method according to claim 1, wherein the target vehicle is located on a side or rear side of the vehicle.

4. The method according to claim 3, wherein the identifying comprises:
   calculating a distance value from a center point of the track for the target vehicle to any one corner of the track for the target vehicle based on a width and a length of the track for the target vehicle; and
   identifying the plurality of pieces of second point data associated with the track for the target vehicle from among the plurality of pieces of first point data based on the distance value.

5. The method according to claim 4, wherein the identifying comprises:

determining the distance value as a radius; and identifying the plurality of pieces of second point data located within the radius from the center point of the track for the target vehicle from among the plurality of pieces of first point data.

6. The method according to claim 1, wherein:

the point data at the first location comprises point data having a smallest value as the angle among the plurality of pieces of second point data, and the point data at the second location comprises point data having a largest value as the angle among the plurality of pieces of second point data.

7. The method according to claim 1, wherein the first corner comprises:

a corner located on a lower right side of a center of the sensor fusion track;

a corner located on a lower left side of the center of the sensor fusion track; or a corner at a shortest distance from a straight line connecting the first location and the second location among the corners of the sensor fusion track.

8. The method according to claim 1, wherein:

the heading angle is calculated by applying a slope value of the two-dimensional equation as a variable of an arc tangent function, an X-axis value of the third coordinate value is calculated based on a value calculated by applying the heading angle as a variable of a sine function, an X-axis value of the second coordinate value, and the half value of the width of the track for the target vehicle, and a Y-axis value of the third coordinate value is calculated based on a value calculated by applying the heading angle as a variable of a cosine function, a Y-axis value of the second coordinate value, and the half value of the width of the track for the target vehicle.

9. A system for sensor fusion in a vehicle, the system comprising:

a communication module including a transceiver configured to receive data from a sensing device of a vehicle;

a memory configured to store data of a sensor fusion track generated for a target vehicle; and a processor electrically connected to the interface and the memory, wherein the processor is configured to:

generate a track for the target vehicle based on data of a surround view monitoring camera of the vehicle received through the interface;

acquire a plurality of pieces of first point data for an object around the vehicle;

identify a plurality of pieces of second point data associated with the track for the target vehicle from among the plurality of pieces of first point data; and update the sensor fusion track using the plurality of pieces of second point data;

select point data at a first location and point data at a second location among the plurality of pieces of second point data based on an angle formed by a straight line connecting each of the plurality of pieces of second point data from an origin and an X-axis in a vehicle coordinate system having a designated location in the vehicle as the origin;

update location information of the sensor fusion track based on information about the first location and the second location;

generate a two-dimensional equation representing a straight line connecting the first location and the second location;

identify a first coordinate value of a first corner among corners of the sensor fusion track;

determine a second coordinate value of a corner corresponding to the first corner among corners of the target vehicle based on the two-dimensional equation and the first coordinate value;

calculate a third coordinate value corresponding to a location of a midpoint of a rear bumper of the target vehicle, thereby updating location information of the sensor fusin track;

identify the second coordinate value having the same Y-axis coordinate value as a Y-axis coordinate value of the first coordinate value in the straight line connecting the first location and the second location;

calculate a heading angle of the sensor fusion track to be updated based on a slope of the straight line connecting the first location and the second location; and calculate the third coordinate value based on a half value of a width of the track for the target vehicle and the calculated heading angle.

10. The system according to claim 9, wherein the target vehicle is located on a side or rear side of the vehicle.

11. The system according to claim 10, wherein the processor is configured to:

calculate a distance value from a center point of the track for the target vehicle to any one corner of the track for the target vehicle based on a width and a length of the track for the target vehicle; and identify the plurality of pieces of second point data associated with the track for the target vehicle from among the plurality of pieces of first point data based on the distance value.

12. The system according to claim 11, wherein the processor is configured to:

determine the distance value as a radius; and identify the plurality of pieces of second point data located within the radius from the center point of the track for the target vehicle from among the plurality of pieces of first point data.

13. The system according to claim 9, wherein:

the point data at the first location comprises point data having a smallest value as the angle among the plurality of pieces of second point data, and the point data at the second location comprises point data having a largest value as the angle among the plurality of pieces of second point data.

14. The system according to claim 9, wherein:

the heading angle is calculated by applying a slope value of the two-dimensional equation as a variable of an arc tangent function, an X-axis value of the third coordinate value is calculated based on a value calculated by applying the heading angle as a variable of a sine function, an X-axis value of the second coordinate value, and the half value of the width of the track for the target vehicle, and a Y-axis value of the third coordinate value is calculated based on a value calculated by applying the heading angle as a variable of a cosine function, a Y-axis value of the second coordinate value, and the half value of the width of the track for the target vehicle.

* * * * *